3,517,643
VAPOR DEPOSITION APPARATUS INCLUDING DIFFUSER MEANS
David R. Goldstein, Peabody, and Pravin C. Parekh, Cambridge, Mass., assignors to Sylvania Electric Products Inc., a corporation of Delaware
Filed Nov. 25, 1968, Ser. No. 778,554
Int. Cl. C23c 11/00
U.S. Cl. 118—48      1 Claim

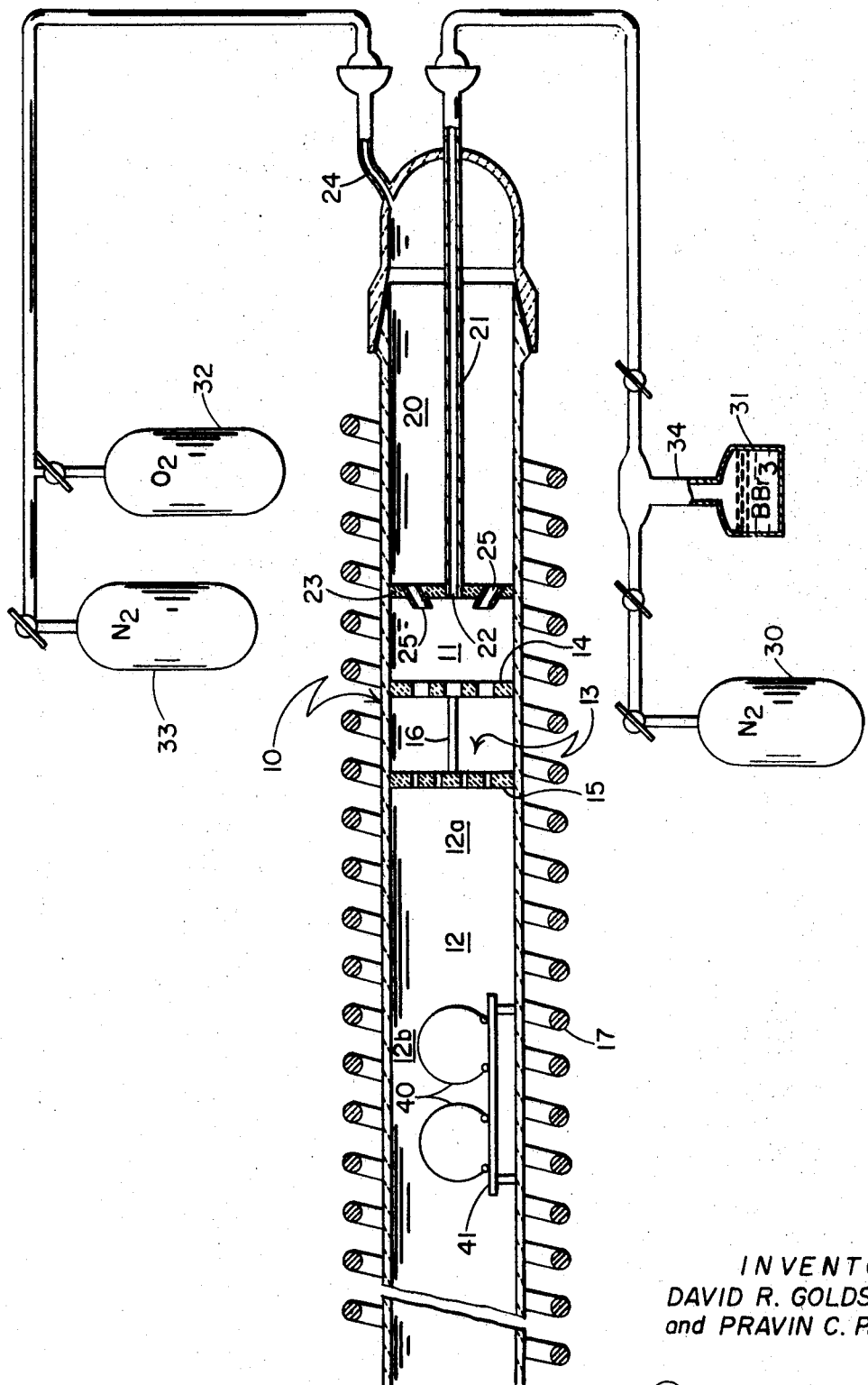

ABSTRACT OF THE DISCLOSURE

Deposition furnace apparatus for reacting boron tribromide ($BBr_3$) and oxygen ($O_2$) to produce boron oxide ($B_2O_3$) which deposits on slicon wafers. Vapors of boron tribromide and oxgyen are mixed in a high temperature mixing section of the furnace. A gas diffuser arrangement retards the flow of gases from the mixing section to the deposition section of the furnace. Thus, the gases are thoroughly mixed and the reaction approaches completion before the gases reach the silicon wafers in the deposition section.

BACKGROUND OF THE INVENTION

This invention relates to deposition aparatus. More particularly, it is concerned with furnace apparatus for reacting gases and depositing a product of the reaction on a substrate.

In the production of semiconductor devices by the well-known techniques of selective diffusion of conductivity type imparting materials into substrates of semiconductor material, a two-step diffusion process is frequently employed. In this process a conductivity type imparting material is first deposited onto the surface of a substrate, and in a subsequent step the substrate is heated to cause the conductivity type imparting material to diffuse into the substrate.

More specifically, it is common practice to diffuse boron, a P-type conductivity imparting material, into silicon by first depositing a layer of boron onto a surface of a silicon wafer in a first furnace apparatus. Subsequently the wafer is heated to a suitable temperature in a second furnace apparatus to cause the boron to diffuse into the silicon wafer. The boron layer is obtained by reacting boron tribromide ($BBr_3$) in the vapor state with oxygen ($O_2$) to produce boron oxide ($B_2O_3$) which then deposits on the silicon wafer and reacts with the silicon to produce boron.

In order to obtain wafers having a desired resistivity profile after diffusion the boron oxide deposition must be uniform. With previously known deposition apparatus problems occurred because of incomplete mixing of the constituent gases ($BBr_3$ and $O_2$) so that the reaction was not uniformly complete and therefore the concentration of boron oxide not uniform when the gases contacted the silicon wafers. In addition, in previously employed deposition apparatus excessive amounts of boron oxide might deposit on the walls of the apparatus making it difficult to control the amount of boron oxide presented to the silicon wafers.

BRIEF SUMMARY OF THE INVENTION

Improved deposition is obtained with apparatus in accordance with the invention which includes an elongated vessel having a mixing section for mixing together gases introduced into that section and a deposition section for containing substrates on which a product of the reaction of the gases is to be deposited. The deposition section is spaced along the length of the vessel from the mixing section and a retardation means is positioned between the mixing section and the deposition section in order to retard the flow of gases from the mixing section to the deposition section. Two gases are introduced into the mixing section where they become mixed. By virtue of the retardation means their flow toward the deposition section is slowed and thus the gases become thoroughly mixed before reaching the deposition section. The deposition section and the mixing section are heated by a suitable heating means to an appropriate temperature for reacting the gases and depositing the product of the reaction on the substrates.

BRIEF DESCRIPTION OF THE DRAWING

Various objects, features, and advantages of deposition apparatus in accordance with the invention will be apparent from the following detailed discussion and the accompanying drawing in which the single figure is an elevational view partially in cross-section representing furnace apparatus in accordance with the invention.

DETAILED DESCRIPTION OF THE INVENTION

Deposition furnace apparatus in accordance with the invention as illustrated in the single figure of the drawing includes a horizontally arranged furnace member 10 of an elongated cylindrical quartz tube. The furnace tube includes a mixing section 11 and a deposition section 12 spaced along the length of the tube from the mixing section. A gas diffuser 13 having two circular quartz plates 14 and 15 with openings therethrough is positioned between these two sections. A rod 16 holds the two plates together so that the diffuser is self-supporting. The plates are disposed across the tube generally normal to the longitudinal axis of the tube.

Resistance heating coils 17 encircle the furnace tube 10, and the tube and heating coils are appropriately enclosed by insulation (not shown). The heating coils 17 maintain the temperature of the deposition section 12 uniform throughout its length. The temperature along the length of the furnace tapers off gradually with distance from the deposition section 12, and the temperature of the mixing section 11 is only slightly below that of the deposition section 12.

A gas inlet arrangement includes the end section 20 of the furnace tube adjacent the mixing section 11. A first inlet tube 21 extends competely through the end section and opens into the mixing section 11 at a central opening 22 in a quartz inlet plate 23. A second inlet tube 24 opens directly into the closed end section 20 of the tube 10. Short quartz tubes 25 through the inlet plate 23 communicate between the end section 20 and the mixing section 11.

Boron tribromide vapors are carried into the mixing section 11 through the first inlet tube 21 by nitrogen from a source 30 passing over a source 31 of liquid boron tribromide. The container holding the boron tribromide communicates with the tubing carrying the nitrogen through a relatively long narrow neck portion 34. By virtue of this arrangement the amount of boron tribromide vapor carried into the furnace is largely independent of the properties of the nitrogen or the level of the liquid boron tribromide in the container, and is dependent on the temperature of the liquid boron tribromide. Oxygen from a source 32 mixed with nitrogen from a source 33 is conducted to the end section 20 by the second inlet tube 24. The oxygen and nitrogen pass through the end section 20 and into the mixing section 11 through the tubes 25 in the inlet or mixing plate 23.

When employing the deposition apparatus as described for forming layers of boron on wafers of silicon, the deposition section 12 is heated to a temperature of about 910° C. The temperature in the mixing section 11 is slightly less, about 870° C. Wafers of silicon 40 mounted in a quartz boat 41 are placed in the deposition section 12 of the furnace. The boron tribromide source is maintained at 21° C. The amounts of oxygen and boron tribromide supplied to the furnace are such that oxygen is in excess of that required to convert all of the boron tribromide to boron oxide.

A first gas consisting of boron tribromide vapors carried by nitrogen passes through the first inlet tube 21 and is directed into the mixing section 11 at the opening 22 in the center of the mixing plate 23. The nitrogen and oxygen mixture constituting a second gas enters the end section 20 of the furnace tube through the second inlet tube 24. The mixture passes through the end section and is directed at an angle into the mixing section 11 by the tubes 25 which extend through the mixing plate 23. The apparatus thus prevents the boron tribromide and oxygen from mixing until they are introduced into the high temperature mixing section 11 of the furnace.

The two plates 14 and 15 of the gas diffuser hold back the flow of gases from the mixing section causing them to mix more thoroughly before passing on to the deposition section 12. The total area of the openings in the second plate 15 of the diffuser is equal to or less than the total area of the openings in the first plate 14 so as to aid in building up a back pressure in the mixing section 11 and retarding the flow of gases. In the apparatus shown in the figure the second plate 15 has a larger number of smaller openings than the first plate 14 and the openings are evenly distributed over the plate. With this configuration the edge effects of the openings provide more drag further retarding the flow of gases and the distribution of the openings smooths the flow of gases into the deposition section 12.

The boron tribromide ($BBr_3$) and the oxygen ($O_2$) in the two gases introduced into the heated mixing section 11 react as they become mixed to produce boron oxide ($B_2O_3$). The reaction continues in the mixing section 11 and as the gases pass through the plates 14 and 15 of the diffuser into the deposition section 12. The silicon wafers 40 are positions in the deposition section 12 at a distance from the diffuser 13 so as to permit the reaction between the boron tribromide and the oxygen to approach completion. Thus, the deposition section 12 may be considered as having a reaction zone 12a adjacent the diffuser 13 and a substrate zone 12b containing the silicon wafers 40.

As the gases pass across the silicon wafers 40 in the substrate zone 12b of the deposition section 12, boron oxide deposits on the surfaces of the wafers. The boron oxide reacts with the silicon to produce elemental boron. After a period of about 14 minutes in the apparatus the boron layer is of the order of 100 angstrom units thick. The wafers are then removed from the apparatus and treated in a diffusion furnace at 1220° C. for a period of 25 minutes to diffuse the boron into the silicon wafers.

Uniform, reproducable deposition of boron oxide on silicon wafers is obtained in apparatus as described. The arrangement for passing nitrogen across the liquid boron tribromide avoids the carrying of liquid boron tribromide into the furnace tube. No reaction takes place between the boron tribromide and the oxygen except at elevated temperatures. Therefore, no boron oxide deposits on the walls in the cooler portions of the furance tube disturb the deposition rate in the substrate zone.

The gas diffuser 13 which retards the flow of gases from the mixing section 11 to the deposition section 12 contributes to thorough mixing of the two constituent gases. Thus, once the system has been properly regulated, an even flow of a homogeneous mixture of gases takes place through the second diffused plate 15 into the reaction zone 12a where the reaction can approach completion before the gases pass across the surface of the silicon wafers. Because of these conditions, uniform deposition of boron oxide takes place on the surfaces of the silicon wafers. Therefore, after subsequent treatment the wafers have P-type conductivity diffused regions of desired resistivity profile.

While there has been shown and described what is considered a preferred embodiment of the present invention, it will be obvious to those skilled in the art that various changes and modifications may be made therein without departing from the invention.

What is claimed is:

1. Apparatus for depositing conductivity type imparting material onto a substrate of semiconductor material including in combination:

an elongated cylindrical hollow member;

a source of a compound of a conductivity type imparting material in the liquid phase;

means for passing an inert gas across the compound of the conductivity type imparting material to produce a first gas containing the compound of the conductivity type imparting material;

a source of a material in the vapor phase to be reacted with said compound;

means for mixing an inert gas with said material to produce a second gas;

said elongated cylindrical hollow member having a mixing section;

first inlet means for conducting said first gas to the mixing section;

second inlet means for conducting said second gas to the mixing section;

said elongated cylindrical hollow member including a deposition section spaced along the length of the member from the mixing section;

retardation means positioned in the elongated cylindrical hollow member between the mixing section and the deposition section for retarding the flow of gases from the mixing section to the deposition section whereby the gases are thoroughly mixed before flowing from the mixing section into the deposition section;

said deposition section including a reaction zone adjacent said retardation means for permitting the reaction between the mixed gases to approach completion, and a substrate zone for containing substrates of semi-conductor material on which a product of the reaction of the mixed gases including conductivity type imparting material deposits;

heating means for heating the deposition section and the mixing section to a temperature at which the gases react to produce the product of reaction including conductivtiy type imparting material and the product of reaction deposits on substrates in the substrate zone;

said elongated cylindrical hollow member including an end section adjacent the mixing section and spaced along the length of the member from the deposition section;

an inlet plate between the mixing section and the end section, said inlet plate being disposed across the elongated cylindrical hollow member normal to the longitudinal axis of the member and having an opening therethrough;

an elongated tube disposed within the end section and fixed to the inlet plate at the opening;

means for supplying said first gas to the elongated tube whereby the first gas flows through the elongated tube and is directed into the mixing section;

said inlet plate having additional openings therethrough communicating between the end section and the mixing section;

means for supplying said second gas to the end section whereby the second gas flows through the end section and is directed into the mixing section through said additional openings in the inlet plate;

said retardation means includes a first plate adjacent the mixing section and disposed across the elongated cylindrical hollow member normal to the longitudinal axis of the member, said first plate having a first plurality of openings therethrough; and a second plate adjacent the deposition section and disposed across the elongated cylindrical hollow member normal to the longitudinal axis of the member, said second plate having a second plurality of openings therethrough;

the total area of the second plurality of openings in the second plate being not more than the total area of the first plurality of openings the first plate.

References Cited

UNITED STATES PATENTS

| | | |
|---|---|---|
| 1,138,628 | 5/1915 | Cook. |
| 2,348,111 | 5/1944 | Crowley. |
| 2,600,733 | 6/1952 | Clift. |
| 2,763,581 | 9/1956 | Freedman _____ 148—175 |
| 3,208,888 | 9/1965 | Ziegler et al. _____ 148—175 |
| 3,297,501 | 1/1967 | Reisman _____ 148—175 |

MORRIS KAPLAN, Primary Examiner